Oct. 6, 1931.  W. McCLINTOCK  1,825,969
BRICK AND METHOD OF MAKING THE SAME
Filed Sept. 19, 1927
Fig. 1.
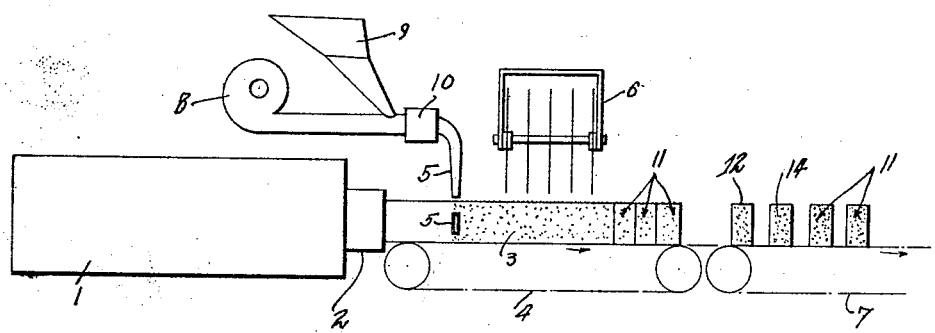
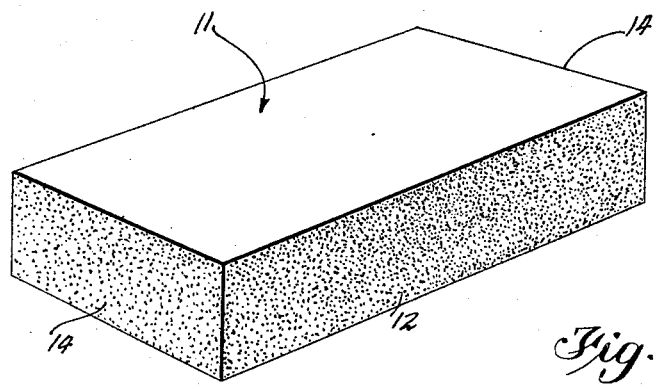
Fig. 2.
Inventor
William McClintock
By Lyon & Lyon
Attorneys Patented Oct. 6, 1931

1,825,969

UNITED STATES PATENT OFFICE

WILLIAM McCLINTOCK, OF LOS ANGELES, CALIFORNIA, ASSIGNOR TO PACIFIC CLAY PRODUCTS, OF LOS ANGELES, CALIFORNIA, A CORPORATION OF CALIFORNIA

BRICK AND METHOD OF MAKING THE SAME

Application filed September 19, 1927. Serial No. 220,346.

This invention relates to bricks and the method of making the same and is more particularly related to a brick having a roughened surface to produce a surface texture thereon and to a method of producing such rough and textured surface.

Bricks, as originally produced in accordance with the hand method, using molds, were made from clay placed into the molds, in which sand or the like had previously been placed. A relatively "soft mud" was employed in this hand method, so that the sand to some extent became imbedded in the clay or mud of which the brick was formed. In the use of faced bricks, particularly for the construction of residences, homes and the like, it is desirable to reproduce the surface texture formed by this ancient method and to form an irregular surface on the faces and ends of the brick to provide depressions and relatively raised portions which produce shadow effects on the surface of the bricks. It is essential that this texture and the roughened or irregular surface be formed in an economical and inexpensive manner.

It is, therefore, an object of this invention to produce a brick having a novel and textured surface, produced by the blasting of sand or similar hard granular substance against the surface of the brick, or column of clay from which the bricks are formed, so that by indentation of the soft clay or material forming the brick and by embedding of granular substance in this material there is produced an irregular surface texture and a roughened surface.

Another object of this invention is to provide a method of producing bricks, including the forming of a column of clay or the like from which the brick is to be formed, blasting sand or other hard granular substance against the surface of the column, cutting the column into bricks of the desired shape and form, and subsequently drying and burning the bricks so formed.

Other objects and advantages of this invention, it is believed will be apparent from the following detailed description of a preferred embodiment of the invention as illustrated in the accompanying drawings.

In the drawings:

Figure 1 is a diagrammatic view of the apparatus employed in carrying out the method embodying this invention.

Figure 2 is a perspective view of a brick embodying this invention.

I have found that bricks may be produced having a rough and textured surface by forcing or blasting granular substances against the surface of the material from which the bricks are formed before the material is dried in such a manner as to force the granular substances into the material.

In accordance with the method embodying this invention, the clay is first mixed in any suitable form of auger brick making machine or the like, as indicated at 1, and extruded therefrom through a die 2. The column 3 of clay is conveyed along a conveyor 4, over which a plurality of sand blast nozzles 5 are positioned so as to jet sand or similar hard granular substance, such for example as finely ground calcined clay or the like, against the surface of the column. The forcing of the granular substance against the column of clay, causing the granular substance to be imbedded in the surface of the clay, and also the blasting of such a granular substance, is not perfectly uniform, producing an irregular surface on the column of the clay. The column of clay is then conducted under or through any suitable form of cutting device, as indicated at 6, by means of which the column of clay is cut into bricks of the desired size and shape. The bricks leaving the cutting machine 6 are conveyed over a conveyor 7, which is operated at a speed slightly in excess of that at which the conveyer 4 is driven, so that the bricks are separated. The bricks are then dried and burned and are ready for use. The mixture of clay in accordance with the process embodying this invention is what is known in the art as "stiff mud", so that the column of clay produced by the die 2 will retain its shape under the force of the blast of granular material from the sand blast nozzles 5. The nozzles 5 are supplied with a mixture of air and granular substance, such as sand, from the air blower 8 and from any suitable source of sand or granular substance fed through a conduit 9 to a mixing chamber 10, in which the sand and granular substance are mixed, before they are jetted from the nozzle 5.

The brick 11 produced in accordance with this method has one of its sides 12 and its two ends 14 formed roughened and irregular by the blast of the granular substance. The effect of producing the irregular surface by the sand blast is to produce shadow effects upon the surface, which is believed to be extremely beneficial in the producing of an artistic exterior for homes, residences and the like.

Having fully described my invention, it is to be understood that I do not wish to limit the application of my invention to the details herein set forth, but my invention is susceptible to brick manufactured by the hand mold or any other process which offers a soft brick which can be roughened and have a textured surface formed thereon by a method embodying my invention, and my invention is of the full scope of the appended claims.

I claim:

1. In a method of continuously producing brick having an irregular roughened surface, the steps of forming a substantially smooth clay column of stiff mud characteristics, blasting a dry, hard, granular material into the surfaces of said clay column whereby said dry, hard, granular material is caused to be partially but firmly embedded in said surfaces, and cutting the column thus treated to form a brick and drying the brick thus formed.

2. In a method of continuously producing brick having an irregular roughened surface, the steps of forming a clay column of stiff mud characteristics, blasting substantially dry sand into the surfaces of said clay column whereby said sand is caused to become partially but firmly embedded in said surface, cutting the column thus treated to form a brick, and drying the brick thus formed.

3. A stiff mud brick provided with a rough and irregular surface having hard, granular, discreet particles partially but firmly embedded in said brick surface.

4. A burned stiff mud brick provided with a rough and irregular surface having discreet sand particles partially but firmly embedded in said brick surface.

Signed at Los Angeles, California, this 8th day of Sept., 1927.

WM. McCLINTOCK.